United States Patent [19]

Hiesener

[11] Patent Number: 5,707,027
[45] Date of Patent: Jan. 13, 1998

[54] APPARATUS FOR OPERATING A VACUUM PLUMBING SYSTEM IN AN AIRCRAFT

[75] Inventor: Stefan Hiesener, Buxtehude, Germany

[73] Assignee: Daimler-Benz Aerospace Airbus GmbH, Hamburg, Germany

[21] Appl. No.: 534,262

[22] Filed: Sep. 26, 1995

[30] Foreign Application Priority Data

Sep. 27, 1994 [DE] Germany ............ 44 34 437.6

[51] Int. Cl.$^6$ .................................................. B64D 11/02
[52] U.S. Cl. .................................... 244/118.5; 4/321
[58] Field of Search ................ 244/1 R, 118.5, 244/129.1; 4/158, 321, 431, 432; 417/158, 157

[56] References Cited

U.S. PATENT DOCUMENTS

| | | | |
|---|---|---|---|
| 1,291,628 | 1/1919 | Parsons | 417/158 |
| 2,044,088 | 6/1936 | Lord | 417/151 |
| 2,431,264 | 11/1947 | Lynett | 4/321 |
| 2,519,531 | 8/1950 | Worn | 417/158 |
| 4,199,828 | 4/1980 | Hellers | 4/321 |
| 4,791,688 | 12/1988 | Krishnakumar | 4/321 |
| 4,905,325 | 3/1990 | Colditz | 4/321 |
| 5,372,710 | 12/1994 | Frank . | |
| 5,396,668 | 3/1995 | Haatanen | 4/321 |
| 5,432,958 | 7/1995 | Bochmann et al. | 4/321 |

FOREIGN PATENT DOCUMENTS 4108549  5/1992  Germany .

*Primary Examiner*—Galen L. Barefoot
*Attorney, Agent, or Firm*—W. G. Fasse; W. F. Fasse

[57] ABSTRACT

A vacuum plumbing system especially in an aircraft equipped with jet engines, is provided with a tap air supply source (4) that receives the tap air from the engine exhaust and is connected with a nozzle (1A) of at least one ejector or jet air pump (1) while the suction port (1C) of the pump (1) is connected through ducts or pipes (7, 11, 12) to a refuse collecting duct (15) either directly or indirectly through refuse collecting tank (9). Filters in the tank and conveying pumps are thus avoided.

20 Claims, 1 Drawing Sheet

APPARATUS FOR OPERATING A VACUUM PLUMBING SYSTEM IN AN AIRCRAFT

FIELD OF THE INVENTION

The invention relates to an apparatus for operating a vacuum plumbing system, particularly a vacuum toilet system in an aircraft, specifically in an aircraft equipped with a power plant. In such a system waste materials from various waste generating locations, such as toilet bowls, kitchen sinks, etc. in the aircraft are transported into a waste collecting tank.

BACKGROUND INFORMATION

German Patent Publication DE 4,108,549 corresponding to U.S. Pat. No. 5,372,710 (Frank) issued on Dec. 13, 1994, discloses a system wherein reduced pressure is used for conveying waste materials into a collection tank, for example from a vacuum toilet. Such a system comprises a pump connected with its suction port through a suction pipe to a filter positioned within the waste collecting tank. The compression is connected through a pressure pipe with the nozzle of an ejector or jet pump. By switching on the pump filtered waste water is transported from the waste collecting tank to the ejector and then flows from the ejector back into the tank. The water jet flowing through the ejector entrains air bubbles so that in the suction port of the ejector the desired reduced pressure is generated.

The use of waste water for operating the ejector, however, leaves room for improvement in that a filter is necessary within the waste collecting tank for removing at least the coarse components of the waste water in order to assure the continuing operability of the pump itself and of the ejector. Such a filter requires a scheduled continuous maintenance operation so that the maintenance and cleaning efforts for the system are rather costly, especially since the filter is positioned inside the collecting tank, so that accessibility also leaves room for improvement. Similarly, the pump for transporting the waste water requires respective maintenance and cleaning efforts. Further, in spite of the filter it is possible that coarse contaminations, such as improperly disposed sanitary napkins can impair the operability of the system during flight when there is not any possibility of cleaning the filter inside the tank.

OBJECTS OF THE INVENTION

In view of the above it is the aim of the invention to achieve the following objects singly or in combination:

to improve the above described system in such a way that a failure of the entire vacuum toilet system is avoided during flight;

to assure the operability of the vacuum toilet system at all times on the ground and in the air with a minimum of maintenance and cleaning efforts; and to construct such a system with due regard to lightweight considerations while still assuring a high efficiency.

SUMMARY OF THE INVENTION

The invention has achieved the above objects in a vacuum plumbing system, e.g. a vacuum toilet system in an aircraft wherein a tap air supply, for example from an aircraft engine, is connected with the nozzle of at least one air jet pump or ejector and that the suction port of the ejector is connected either directly or indirectly with a waste collecting pipe leading into a collecting tank. In the direct connection the waste collecting pipe is connected to the funnel-shaped housing of the ejector. In the indirect connection the waste collecting pipe is connected through the collecting tank to the funnel-shaped housing of the ejector or air jet pump.

It is a special advantage of the invention that a filter in the collecting tank is no longer necessary so that the operability of the vacuum toilet system according to the invention is assured with a minimum of maintenance and cleaning efforts in an aircraft at all times. Yet another advantage is seen in that a separate circulating pump is not necessary which substantially reduces the weight of the system while also permitting to simultaneously maintain a very efficient energy consumption because the pneumatic energy is directly available from the power plant of the aircraft and there is no need for converting one form of energy into another form of energy so that losses normally encountered in such conversions are also avoided.

Yet another important advantage of the invention is seen in that the tap air can be used to help empty the waste collecting tank by increasing the pressure in the tank with the tap air, whereby the emptying is accelerated and the total maintenance time is correspondingly reduced or even minimized.

Freeze-up of exposed areas of the waste collecting system is prevented by using hot tap air for heating at least portions of the system, especially at high altitudes. This feature of the invention achieves the further advantage that electrically operated heating installations for preventing freeze-ups are avoided so that again energy and weight are saved.

The present system also has the advantage that the emptying of the collecting tank is facilitated in various ways. On the one hand emptying on the ground can take place simply by gravity. However, the emptying may be accelerated by an external pressurized air supply or when the engines are running with an internal pressurized air supply to the collection tank by directly using the tap air. Further, by using a tank venting duct the empty tank can be scavenged or rinsed without any need for a separate scavenging duct.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
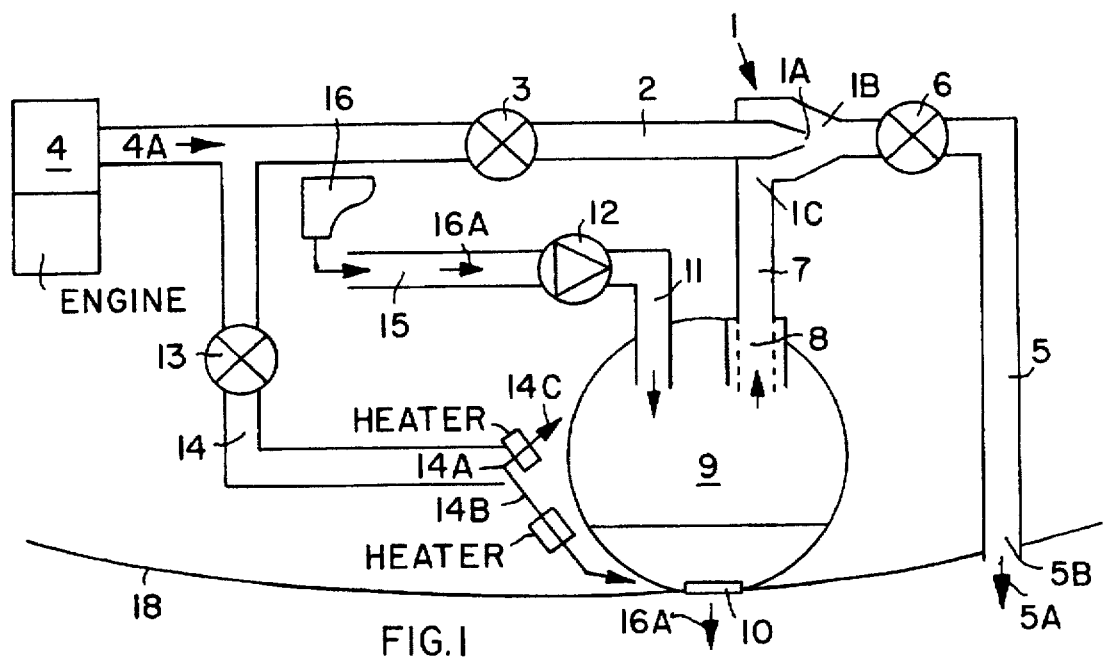
FIG. 1 shows a first embodiment of the invention in which the waste collecting pipe is indirectly connected to the suction port of an ejector through the waste collecting tank.

FIG. 1 shows a schematic illustration of a first embodiment for operating a vacuum toilet or plumbing system in an aircraft. Waste material 16A coming, for example, from a toilet bowl 16 travels through a waste collecting duct 15 to a waste collecting tank 9 which in turn is connected through a suction pipe 7 to the suction port 1C in the housing of a jet pump or ejector 1. A pressure pipe 2 with a throttling and closure valve 3 connects the nozzle 1A of the air jet pump or ejector 1 to a source 4 of tap air 4A. The source of tap air is preferably the exhaust of a jet engine. A funnel shaped discharge port 1B of the ejector 1 is connected through a closure and control valve 6 to a waste air outlet or venting pipe 5 for transporting waste air 5A out of the collecting tank 9. For this purpose a discharge port 5B is provided in the aircraft hull 18.

The connection of the suction port 1C of the ejector 1 through the pipe 7, the water separator 8, and the tank 9 to the waste collecting ducts or pipes 11 and 15 provides sufficient suction for transporting the waste material 16A into the tank 9. The collecting duct 15 is connected on the one hand to waste generating stations such as a toilet bowl 16 and, on the other hand, through a suction pipe 11 to the tank. Preferably, a non-return valve or flap 12 is installed at the junction between the collecting duct 15 and the suction pipe 11 in order to close off the duct 15 if necessary.

A branch line 14 connected through a valve 13 to the tap line or duct 2 provides protection against freeze-ups of components in the waste collecting system mounted in colder locations of the aircraft body by feeding hot air 14A to these locations where freeze-up must be prevented. The branch line 14 is connected to respective heat exchangers positioned at locations endangered by freeze-up, for example, near the collecting tank 9 and a tank emptying valve 10 for removing refuse 16A from the tank 9 on the ground. These heat exchangers or heat discharge units for heating the freeze-up endangered components may be constructed as hot air channels surrounding the collection tank 9 and/or the discharge valve 10. Hot air 4A branched off from the tap line 2 is controlled by a valve 13 in accordance with varying needs and to different locations, including to areas close to the aircraft body skin 18. This feature of the invention avoids additional and usually expensive primarily electrically operated heating installations to save energy and weight.

The discharge valve 10 in the collecting tank 9 is positioned in the aircraft body wall 18 for discharging of refuse 16A when the aircraft is parked on the ground. By arranging the tank 9 and its valve 10 at a low point the discharge can be accomplished in various ways, for example simply by gravity or by blowing air into the venting pipe 5 with the valve 6 in the open state. Alternatively, tap air can be blown into the tank 9 through the ejector 1 and the suction pipe 7 in FIG. 1 or the suction ejector 1 and pipe section 11A in FIG. 2.

The present system is also operable prior to a point of time when a sufficiently low external pressure outside the aircraft body at high altitude becomes available. In other words, the present system is operable at low altitudes and on the ground provided that the aircraft engines or an auxiliary power source of the aircraft or a ground service air supply is available to provide the required tap air for continued operation of the vacuum toilet system which at high altitude takes advantage of the pressure difference inside and outside the aircraft. At low altitudes and on the ground the present system works as follows. Tap air 4A provided by the tap air device 4, which is preferably connected to a jet engine, flows through the open throttling and closure valve 3 and through the pressure pipe 2 into the nozzle 1A of the air jet pump or ejector 1. The flow of tap air 4A through the ejector 1 entrains air particles so that the suction port 1C and the suction pipe 7 are provided with the desired reduced pressure which is also generated in the refuse collecting tank 9 and in the suction pipe 11. The non-return or one way flap 12 thus is opened and refuse 16A from a source 16, such as a toilet bowl, wash basin, or kitchen sink, is transported into the collecting tank 9. For this operation the control valve 6 is open so that air flowing from the source 16 into the tank 9 is vented together with the tap air 4A as exhaust air 5A that passes through the water separator 8 after having passed through the air jet pump 1. The exhaust air 5A is discharged through the venting pipe 5 and the open valve 6 to the outside of the aircraft. When cruising altitude has been reached, the just described operation is stopped and advantage is taken of the pressure differential between the inside and outside of the aircraft by closing the valve 3 and the required reduced pressure is now established in the tank by properly controlling the valve 6 as required.

The supply of heated air in the heating duct 14 is controllable by the valve 13 which is preferably a closed loop controlled valve. Experience shows that more heating energy is required as the aircraft reaches higher altitudes and when it flies at cruising altitude compared to lower altitudes. However, during cruising flight the use of tap air for producing the reduced pressure is not absolutely necessary as mentioned above, because the pressure differential between inside and outside of the aircraft can be used for the generation of the required vacuum in the plumbing system. However, it is possible to substantially reduce the volume of tap air for heating purposes and to tap off only that volume that is necessary to provide the required heating air 14A. This volume can be kept relatively low.

When an aircraft is parked on the ground, the collecting tank 9 can be emptied through the discharge valve 10 either by gravity or with a pressurization of the tank 9, for example through the tap air supply 4. For this purpose the valve 10 in the bottom of the tank 9 is opened and the valve 6 is closed while the valve 3 is opened so that the tap air 4A can pass through the suction port 1C into the suction duct or pipe 11 to enhance the removal of the content from the tank 9, thereby assuring a speedy emptying. The non-return flap 12 is closed in this instance. In another alternative it is possible to avoid using tap air from the engines of the aircraft on the ground and to use a ground based compressed air source connected to port 5B. At this time the valve 3 is closed and compressed air passes through the venting duct 5 and through the now open valve 6 into the tank 9 to thereby accelerate emptying the tank 9. The tank 9 may also be scavenged or rinsed through the venting duct 5 whereby the valves are in the just mentioned positions. A cleaning liquid may be introduced into the tank 9 from a ground based cleaning liquid source connected to the outlet port 5B. An efficient cleaning of the tank 9 is thus possible.

Figure 2:
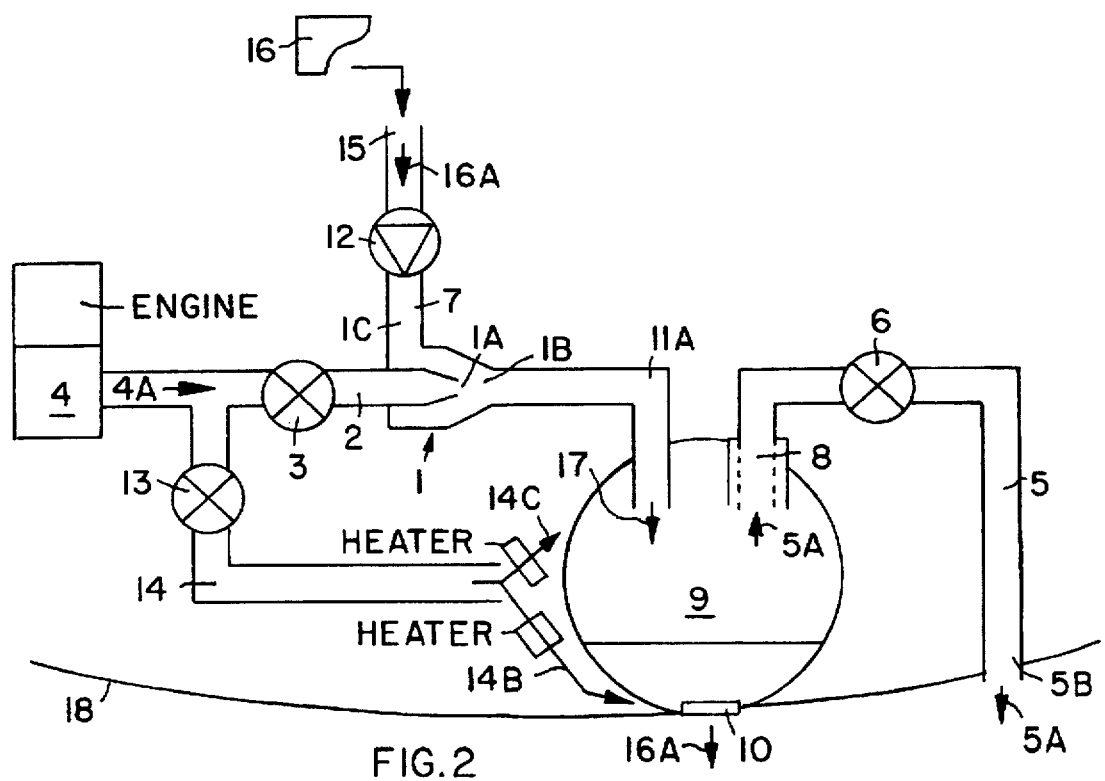
FIG. 2 shows an embodiment in which the waste collecting pipe is directly connected to the suction port of the ejector or jet pump.

FIG. 2 illustrates a vacuum plumbing system, especially a toilet system in an aircraft, as another embodiment of the present invention. A tap air supply 4 is connected through a throttling and closure valve 3 in a pressurized pipe 2 to the nozzle 1A of the ejector 1. The funnel-shaped housing forms a funnel shaped discharge port 1B of the ejector 1. The discharge port 1B is directly connected through a pipe section 11A with the collecting tank 9. The suction port 1C of the ejector 1 is connected through a suction duct 7 to a collecting duct 15 for transporting the refuse 16A collected from toilet bowls 16, kitchen sinks, and/or wash basins into the collecting tank 9. The suction pipe 7 is closable relative to the collecting duct 15 by the non-return flap 12. The tank 9 comprises preferably in its upper area a connection to the pipe section 11A and to an air discharge through the water separator 8 and the control valve 6 which is preferably a closed loop controlled valve provided in the venting duct 5 leading to the outside of the aircraft through venting port 5B.

In order to simultaneously obtain protection against freeze-up of system components located in cold aircraft zones, especially near the body skin 18, a further control valve 13 in a heating air duct 14 is connected to the tap air supply 4. The heating air duct 14 is connected, as mentioned above with heat exchangers positioned close to locations that are subject to freeze-up, such as the collecting tank 9 and the discharge valve 10. Depending on the need, the closed loop control valve 13 is opened to supply hot tap air 4A from the tap air supply 4 and fed through the heating duct 14 as heating air 14A to the mentioned heat exchangers. In this embodiment the tap air 4A passing through the ejector 1 is not immediately discharged to the outside. Rather, the tap air stream 4A first enters into the interior of the tank 9 to thereby provide additional heating of the tank 9 and its content. This feature of the invention has the advantage that additional and costly primarily electrically energized heating installations are avoided, whereby energy and weight is saved.

The above mentioned discharge valve 10 of the tank 9 is preferably arranged at the lowest possible point at the bottom of the tank 9, whereby the several above mentioned discharge possibilities are provided, namely to either use gravity or pressurization with the tap air or a ground based compressed air source for emptying the tank 9.

The operation of the system shown in FIG. 2 will now be described. As long as the pressure difference between the cabin and the environment is insufficient at low altitudes and on the ground to sustain the required vacuum in the plumbing system, the tap air 4A is provided by a tap air supply 14 which preferably is a jet engine. The tap air flows through the pressure pipe 2 and through the opened throttling and closure valve 3 into the nozzle 1A of the ejector 1. When air flows through the ejector 1, the air flow of the tap air stream 4A entrains air as well as refuse particles from the suction pipe 7 so that the required reduced pressure is established at the suction port 1C and in the suction pipe 7 connected to the port 1C. The non-return flap 12 opens, whereby refuse 16A from refuse producing locations 16 is transported together with the tap air 4A through the funnel-shaped discharge port 1B of the housing of the ejector 1 and through the pipe section 11A into the refuse tank 9 as shown by the ejector jet 17. The air flowing into the tank 9 is discharged as waste air or exhaust air 5A through the water separator 8 and through the venting duct 5 as long as the valve 6 is open to discharge the waste air outside the aircraft. Upon completion of the conveyance of the refuse 16A into the tank 9, the non-return flap 12 closes itself again.

Upon reaching cruising altitude where a sufficient pressure differential is established, the closure valve 3 is closed and the vacuum necessary for the conveyance of the refuse is established by the lower pressure outside the aircraft. At this time the closed loop controlled valve 6 is correspondingly controlled to open to the extent necessary. When the valve 6 is open, the pipe section 11A functions as a suction pipe provided the above mentioned pressure differential is established.

The supply of heating air in the heating duct 14 is controlled by the valve 13 which preferably is also a closed loop controlled valve. Experience shows that upon reaching cruising altitude the required heating air volume increases. However, since during cruising flight it is not absolutely necessary to use tap air for generating the required vacuum, it is possible to control the total volume of tap air for the operation of the plumbing system, especially the toilet system, to be relatively small.

If tap air is used in the embodiment of FIG. 2 for producing the required reduced pressure, the tap air stream 4A passing through the ejector 1 is not immediately discharged to the outside. Rather, it passes first through the tank 9 where its heat content is used at least partly for heating the tank and its content. If desired, for example if substantial problems arise with regard to freeze-up in the vacuum toilet system, it is alternatively possible compared to the above described operation of the first embodiment, to supply a reduced volume of tap air stream through the control valve 3 into the inside of the tank 9 for heating purposes, preferably during the entire flight, even when the pressure differential between interior and exterior of the aircraft is used for generating the vacuum required for refuse transport.

If an aircraft equipped with the system according to FIG. 2 is parked on the ground, the emptying of the tank 9 through the valve 10 can also be performed in different ways, namely by gravity or by pressurization through the tap air system or through a ground based source of pressurized air. When tap air is used, the valve 10 is opened and the valve 6 is closed. The valve 3 is open and the tap air 4A passes through the funnel shaped discharge port 1B of the housing of the ejector 1 and through the pipe section 11A into the tank 9 thereby facilitating the removal of the tank content.

When a ground based source of pressurized air is used while the aircraft is parked on the ground, the valve 3 is closed and the non-return flap 12 is also closed. Now it is possible to supply pressurized air through the venting duct 5 and the open valve 6 into the tank 9 with a pressure sufficient for accelerating the emptying of the tank 9. The rinsing of the tank 9 is made possible by connecting a source of cleaning liquid to the discharged port 5B and through the venting duct 5 and the open valve 6 into the tank 9. This cleaning operation is the same in both embodiments.

Although the invention has been described with reference to specific example embodiments, it will be appreciated that it is intended to cover all modifications and equivalents within the scope of the appended claims.

What is claimed is:

1. An apparatus for operating a vacuum plumbing system especially in an aircraft equipped with a power plant, said apparatus comprising at least one refuse (16A) generating source (16), a tap air source (4) connectable to said power plant, at least one collecting tank (9), at least one collecting duct (15) connecting said at least one refuse generating source to said at least one collecting tank (9), an ejector (1) having a nozzle (1A) connected to said tap air source (4) and a suction port (1C) connected to said collecting tank (9), and connecting elements interconnecting said collecting duct (15) and said suction port (1C) of said ejector (1) through said collecting tank (9) so that refuse is directly sucked into said collecting tank (9) through said ejector.

2. The apparatus of claim 1, further comprising a throttling and closure valve (3) and a pressure pipe (2), wherein said tap air source (4) is connected through said throttling and closure valve (3) in said pressure pipe (2) with said nozzle (1A) of said ejector (1).

3. The apparatus of claim 1, further comprising a venting duct (5) and a vent closure and control valve (6), wherein said ejector (1) has a housing with a funnel-shaped discharge port (1B) connected to said venting duct (5), and wherein said connecting elements interconnect said suction port (1C) of said ejector (1) with said collecting tank (9), said apparatus further comprising a water separator (8) in said tank, whereby said suction port (1C) is connected to said water separator, and a non-return valve (12) in said collecting duct (15) which connects said refuse generating source (16) to said refuse collecting tank (9).

4. The apparatus of claim 3, wherein one end of said venting duct (5) comprises a venting air discharge (5B) leading to the outside of the aircraft.

5. The apparatus of claim 1, further comprising a discharge valve (10) arranged inside said collecting tank at the lowest point of said collecting tank.

6. The apparatus of claim 1, further comprising in an upper area of said collecting tank (9.), at least one inlet for refuse (16A) and at least one air output for discharging air (5A).

7. The apparatus of claim 1, further comprising a hot air duct (14) and a valve (13) in said hot air duct (14), wherein said tap air source (4) is connected through said valve (13) to said hot air duct (14), and hot air discharge devices connected to said hot air duct (14) for feeding hot air to said hot air discharge devices positioned near components endangered by freeze-up near said collecting tank (9).

8. The apparatus of claim 7, wherein said hot air discharge devices are constructed as air discharge channels (14B, 14C) positioned at said collecting tank (9) and/or at a discharge valve (10) in said collecting tank (9).

9. The apparatus of claim 3, wherein said venting duct (5) comprises a coupling inlet port (5B) connectable to a compressed air source to pressurize said collecting tank (9) for discharge of its content.

10. The apparatus of claim 1, comprising closed loop control valves.

11. The apparatus of claim 9, wherein said coupling inlet port (5B) is connectable to an external source of air combinable with a source of cleaning liquid for cleaning said refuse collecting tank.

12. An apparatus for operating a vacuum plumbing system especially in an aircraft equipped with a power plant, said apparatus comprising at least one refuse (16A) generating source (16), a tap air source (4) connectable to said power plant, at least one collecting tank (9), at least one collecting duct (15) connecting said at least one refuse generating source to said at least one collecting tank (9), an ejector (1) having a nozzle (1A) connected to said tap air source (4), a suction port (1C) connected to said refuse generating source (16), and a discharge port (1B) connected directly to said collecting tank (9), a venting and cleaning duct (5) connecting said refuse collecting tank (9) to the atmosphere, and a control valve (6) in said venting duct (5).

13. The apparatus of claim 12, further comprising a discharge valve (10) arranged inside said collecting tank at the lowest point of said collecting tank.

14. The apparatus of claim 12, further comprising in an upper area of said collecting tank (9), at least one inlet for refuse (16A) and at least one air output for discharging air (5A).

15. The apparatus of claim 12, further comprising a hot air duct (14) and a valve (13) in said hot air duct (14), wherein said tap air source (4) is connected through said valve (13) to said hot air duct (14), and hot air discharge devices connected to said hot air duct (14) for feeding hot air to said hot air discharge devices positioned near components endangered by freeze-up near said collecting tank (9).

16. The apparatus of claim 12, wherein said hot air discharge devices are constructed as air discharge channels (14B, 14C) positioned at said collecting tank (9) and/or at a discharge valve (10) in said collecting tank (9).

17. The apparatus of claim 12, wherein said ejector (1) has a housing with a funnel-shaped discharge port 1B connected with said collecting tank (9), wherein said suction port (1C) of said ejector (1) is connected to said refuse collecting duct (15) whereby said refuse collecting duct (15) extends from said refuse generating source (16), wherein said refuse collecting duct (15) comprises a non-return flap (12), said apparatus further comprising a water separator (8) in said collecting tank (9), said venting and cleaning duct (5) being connected to said collecting tank (9) through said water separator (8).

18. The apparatus of claim 17, wherein one end of said venting duct (5) comprises a venting air discharge (5B) leading into the outside of the aircraft.

19. The apparatus of claim 12, wherein said venting duct (5) comprises a coupling inlet port (5B) connectable to a compressed air source to pressurize said collecting tank (9) for discharge of its content.

20. The apparatus of claim 19, wherein said coupling inlet port (5B) is connectable to an external source of air combinable with a source of cleaning liquid for cleaning said refuse collecting tank.

* * * * *